(No Model.) 3 Sheets—Sheet 1.
T. R. MORGAN, Sr. & W. H. MORGAN.
CHARGING CRANE.
No. 520,488. Patented May 29, 1894.
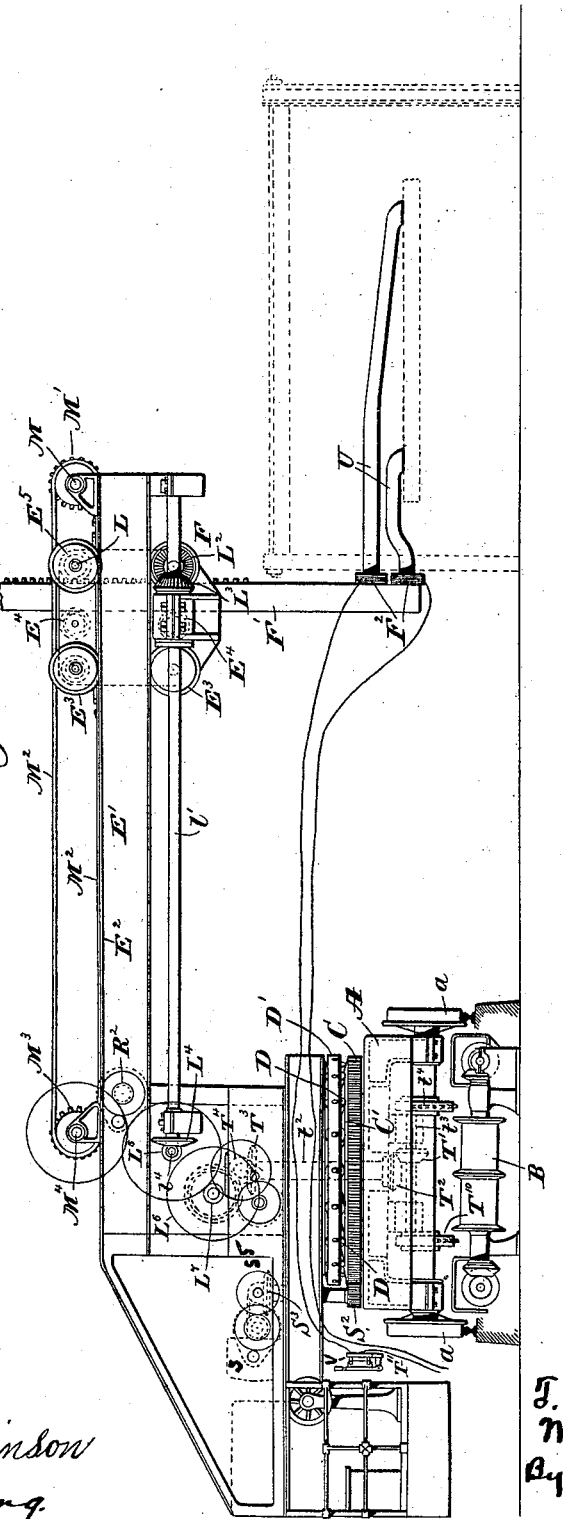
Witnesses
Jas. E. Hutchinson
G. F. Downing
Inventors
T. R. Morgan Sr. &
W. H. Morgan
By H. A. Seymour
Attorney

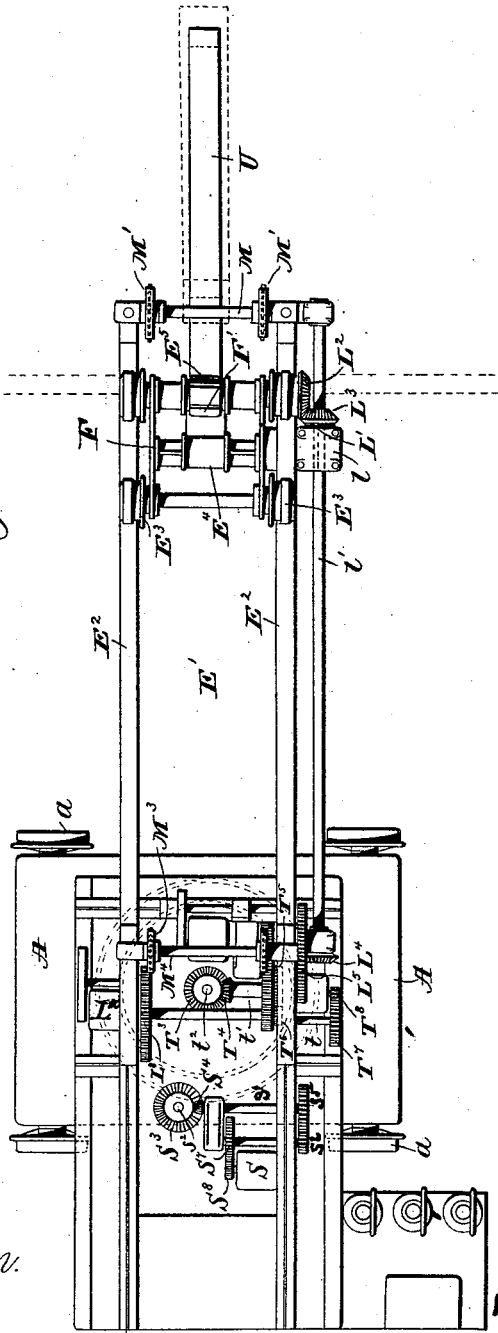

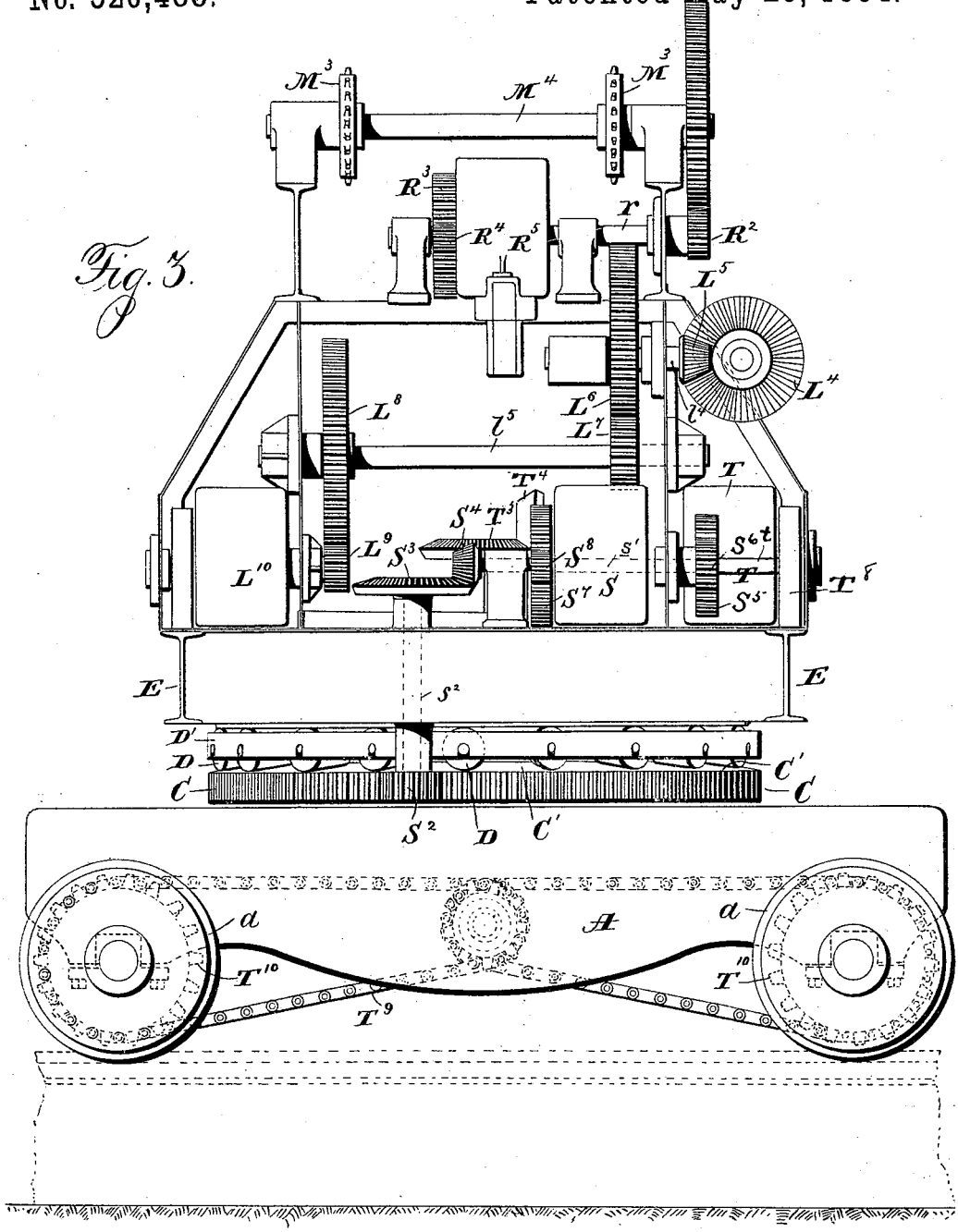

UNITED STATES PATENT OFFICE.

THOMAS R. MORGAN, SR., AND WILLIAM HENRY MORGAN, OF ALLIANCE, OHIO, ASSIGNORS OF ONE-HALF TO THOMAS R. MORGAN, JR., AND JOHN R. MORGAN, OF SAME PLACE.

CHARGING-CRANE.

SPECIFICATION forming part of Letters Patent No. 520,488, dated May 29, 1894.

Application filed April 8, 1893. Serial No. 469,601. (No model.)

*To all whom it may concern:*

Be it known that we, THOMAS R. MORGAN, Sr., and WILLIAM HENRY MORGAN, of Alliance, in the county of Stark and State of Ohio, have invented certain new and useful Improvements in Charging-Cranes; and we do hereby declare the following to be a full, clear, and exact description of the invention, such as will enable others skilled in the art to which it appertains to make and use the same.

Our invention relates to an improvement in charging cranes or cranes designed for placing ingots or slabs in and removing them from the furnaces, and it consists in the parts and combinations of parts as will be more fully described and pointed out in the claims.

In the accompanying drawings, Figure 1 is a view in side elevation of our improved crane. Fig. 2 is a plan view of same and Fig. 3 is an end view.

A represents a truck of any suitable size and construction mounted on wheels $a$, and adapted preferably to run on trackway leading to the roller table B. The truck A is provided with a circular rack C and circular platform or bed plate C' the latter being inclined upwardly and inwardly as shown and forming a trackway on which the tapering rollers D carrying the movable platform E rest. This platform rests on the rollers D which latter are carried by the ring D', and the said platform is centrally mounted on a king bolt on which it turns in sluing or racking.

The platform E carries the boom E', and projects at one end beyond the truck where it is, if necessary, provided with a counterweight for counterbalancing the boom and ingot, and also for the attachment of the operator's platform, on which are carried the devices for actuating the several electric motors to be hereinafter referred to. The boom is composed of two parallel beams $E^2$ separated a suitable distance and connected at their ends only, to permit of the free travel of the trolley F which latter carries the rack F'. The trolley consists simply of a frame having flanged wheels $E^3$ adapted to travel on the upper and lower faces of the beams $E^2$ and also provided with the guide pulleys $E^4$ which maintain the rack F' in a vertical position, and with the pinion $E^5$ which latter engages the teeth of the rack bar and elevates or lowers same as necessity demands. This pinion $E^5$ is mounted on shaft L which latter is provided at its outer end with bevel pinion $L^2$. This wheel $L^2$ engages bevel pinion $L^3$ rigidly secured to sleeve L' mounted in box $l$ carried by the trolley. The sleeve L' has a bore angular in cross section through which passes the angular shaft $l'$ mounted at its ends in bearings located at or near the opposite ends of the boom. This shaft is provided on its inner end with a bevel pinion $L^4$, which in turn meshes with bevel pinion $L^5$ on shaft $l^4$. Shaft $l^4$ carries a toothed wheel $L^6$ (see Fig. 3) which meshes with toothed wheel $L^7$ on shaft $l^5$, which latter also carries toothed wheel $L^8$ which meshes with wheel $L^9$ on the armature shaft of lifting motor $L^{10}$. The sleeve L' being free to slide on the angular shaft it follows that by actuating the motor the rack bar can be elevated and lowered irrespective of the position of the trolley on the boom and while the trolley is in motion or at rest.

Mounted on a shaft M journaled in the end of the boom are sprocket wheels M' around which pass chains $M^2$. These chains as clearly shown in Fig. 1 are each secured at one end to the trolley at the front thereof, and pass from thence under and over wheels M' back toward the axis of the boom and over and under sprocket wheels $M^3$ and thence forwardly to the trolley to which they are secured. Thus it will be seen that the chains are in effect endless chains, the trolley uniting the two ends forming a part of each.

The sprocket wheels $M^3$ are mounted on shaft $M^4$ journaled in bearings secured on the boom and is provided at one end with toothed wheel which latter meshes with smaller wheel $R^2$ fast on shaft $r$. This shaft $r$ carries the wheel $R^3$ (see Fig. 3) which in turn meshes with pinion $R^4$ on the armature shaft of the electric motor $R^5$. By means of this motor and gearing the trolley with the rack bar carried thereby can be moved back and forth on the boom.

The platform with the boom are rotated by the motor S through the intervention of the following gearing: The armature shaft of the motor is provided with a small pinion $S^8$ which meshes with the larger pinion $S^7$ fast on shaft $s$. This shaft carries pinion $S^6$ meshing with pinion $S^5$ fast on shaft $s'$, which latter carries miter wheel $S^4$. Wheel $S^4$ meshes with miter wheel $S^3$ on shaft $s^2$ and the latter is provided at its lower end with the toothed wheel $S^2$ which engages the circular rack fast on the platform. By means of this motor and the gearing connecting the same with the circular rack the platform carrying the boom can be shifted or turned to any desired position.

The crane with the parts thereon are propelled by the traveling motor T, which is provided on its armature shaft with the pinion $T^8$ which meshes with the pinion $T^7$ on shaft $t$ see Fig. 2. Shaft $t$ carries pinion $T^6$ which latter meshes with wheel $T^5$ on shaft $t'$ and the latter is provided on its opposite end with a miter wheel $T^4$ in engagement with miter wheel $T^3$ on shaft $t^2$. This shaft passes through the king bolt and is provided on its lower end with a miter wheel $T^2$ which meshes with wheel $T'$ on shaft $t^3$ journaled on the under side of the truck. This shaft $t^3$ carries sprocket wheels $t^4$ around which pass chains $T^9$ which connect said sprocket wheels with sprocket wheel $T^{10}$ on the axles.

The rack bar F is provided near its lower end with electro-magnets $F^2$ located in the main circuit $T^{11}$ of a generator, each helix of the magnet being provided with a pole piece or core U projecting some distance beyond the helix and preferably of unequal lengths. These cores U which with the rack bar form in effect a horse shoe magnet are each provided with a flat face for contact with an ingot or slab and can be arranged as shown so as to engage the ingot or slab on the upper side and near the opposite ends thereof, or if desired the cores can be arranged to engage it on the top and one side. The circuit, in which the magnets are included is provided with a switch V for opening and closing the circuit. With the switch closed as shown in Fig. 1, the electric current passes through the helices while the magnetic current passes through pole pieces or cores to and through the slab to the other core.

To operate the device the boom is turned to a position convenient to the ingot or slab and the rack bar is then lowered until the cores or poles are in contact with said ingot or slab. The switch having been closed the electric current passes through the helices, while the magnetic current passes from one pole through the slab to the other and causes the slab to adhere to the cores. The rack can then be elevated and the boom turned to bring the ingot opposite in line with the furnace door after which the trolley is moved outwardly to carry the slab or ingot into the furnace. After the ingot or slab has been lowered onto the floor of the furnace the electric current is broken which weakens the magnetic current this releasing the cores from the ingot and permitting the former to be withdrawn.

It is evident that numerous slight changes might be resorted to in the relative arrangement of parts herein described without departing from the spirit and scope of our invention, hence we would have it understood that we do not wish to limit ourselves to the exact construction herein shown, but, Having fully described our invention, what we claim as new, and desire to secure by Letters Patent, is—

1. The combination with movable support, of an electro magnet carried thereby said magnet having projecting poles or cores of unequal lengths and included in an electric circuit, substantially as set forth.

2. The combination with a support movable vertically and horizontally, of an electro magnet carried by said support, said magnet having projecting cores of unequal lengths and a switch included in the electric circuit, substantially as set forth.

3. The combination with a movable boom, a traveling trolley thereon, and a movable support carried by said trolley, of a magnet carried by said support, the said magnet being located in an electric circuit and having projecting cores of unequal lengths, and a switch included in said circuit, substantially as set forth.

4. The combination with a movable boom and a trolley carried thereby, of rack bar carried by the trolley, electro-magnet carried by the rack bar and included in an electric circuit, pole pieces or cores projecting from the magnet and a switch included in the electric circuit, substantially as set forth.

5. The combination with a truck, a rotary platform thereon, a boom a traveling trolley on the boom and a rack bar carried by the trolley, of electro-magnet carried by the rack bar and included in an electric circuit, each helix having a projecting pole or core, and a switch included in the electric circuit.

6. The combination with a truck a rotary platform carrying a trackway, a trolley mounted on said trackway, rack bar carried by said trolley and electric motors and gearing for moving the truck rotating the platform, moving the trolley and elevating and lowering the rack bar, of electro magnet carried by said rack bar, each helix having a projecting pole piece or core and a switch included in the electric circuit, substantially as set forth.

In testimony whereof we have signed this specification in the presence of two subscribing witnesses.

THOMAS R. MORGAN, Sr.
WILLIAM HENRY MORGAN.

Witnesses:
H. W. HARRIS,
T. D. RUSSELL.